US011860563B2

(12) United States Patent
Ishizuka

(10) Patent No.: US 11,860,563 B2
(45) Date of Patent: Jan. 2, 2024

(54) IMAGE FORMING APPARATUS CONFIGURED TO CONTROL CONVEYING SPEED OF SHEET IN ACCORDANCE WITH AMBIENT TEMPERATURE AFTER PAPER JAM IS RESOLVED

(71) Applicant: BROTHER KOGYO KABUSHIKI KAISHA, Nagoya (JP)

(72) Inventor: Daisuke Ishizuka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/813,370

(22) Filed: Jul. 19, 2022

(65) Prior Publication Data

US 2023/0045650 A1 Feb. 9, 2023

(30) Foreign Application Priority Data

Aug. 5, 2021 (JP) ................................ 2021-128885

(51) Int. Cl.
*G03G 15/00* (2006.01)

(52) U.S. Cl.
CPC ......... *G03G 15/70* (2013.01); *G03G 15/5008* (2013.01); *G03G 15/5045* (2013.01)

(58) Field of Classification Search
CPC . G03G 15/70; G03G 15/5008; G03G 15/5045
See application file for complete search history.

(56) References Cited

U.S. PATENT DOCUMENTS

| | | | | |
|---|---|---|---|---|
| 6,213,584 B1 * | 4/2001 | Noyes | G06K 15/102 347/43 |
| 6,542,703 B1 * | 4/2003 | Jung | G03G 15/50 399/68 |
| 2002/0018679 A1 * | 2/2002 | Miyajima | G03G 15/234 399/389 |
| 2002/0176716 A1 * | 11/2002 | Yokoi | G03G 21/0005 399/21 |

(Continued)

FOREIGN PATENT DOCUMENTS

| | | |
|---|---|---|
| JP | 2012189699 A | 10/2012 |
| JP | 2016052174 A | 4/2016 |
| JP | 2020114766 A | 7/2020 |

*Primary Examiner* — David H Banh
(74) *Attorney, Agent, or Firm* — Scully, Scott, Murphy & Presser, PC

(57) ABSTRACT

An image forming apparatus includes: a motor; a temperature detector; a conveyor; a sheet detector; and a controller configured to perform: (a) controlling a conveying speed of the sheet; (b) determining whether a paper jam has occurred; and (c) determining, when the paper jam has occurred, whether a torque shortage has occurred. The torque shortage is shortage of a torque occurring during conveyance of the sheet. When the torque shortage has occurred, and the paper jam is resolved and conveyance of the sheet is resumed, the controller performs in the (a) controlling: controlling, when an ambient temperature detected by the temperature detector is higher than a predetermined temperature, the conveying speed to become a first conveying speed; and controlling, when the ambient temperature is lower than or equal to the predetermined temperature, the conveying speed to become a second conveying speed slower than the first conveying speed.

9 Claims, 7 Drawing Sheets

(56) References Cited

U.S. PATENT DOCUMENTS

| | | | | |
|---|---|---|---|---|
| 2004/0091276 | A1* | 5/2004 | Yoshida | G03G 15/6529 399/302 |
| 2006/0188291 | A1* | 8/2006 | Kawakami | G03G 15/657 399/167 |
| 2007/0212083 | A1* | 9/2007 | Ishikuro | G03G 15/5008 399/167 |
| 2020/0166875 | A1* | 5/2020 | Sato | G03G 15/5029 |
| 2021/0365016 | A1* | 11/2021 | Hasanian | B29C 64/393 |

* cited by examiner

IMAGE FORMING APPARATUS CONFIGURED TO CONTROL CONVEYING SPEED OF SHEET IN ACCORDANCE WITH AMBIENT TEMPERATURE AFTER PAPER JAM IS RESOLVED

REFERENCE TO RELATED APPLICATIONS

This application claims priority from Japanese Patent Application No. 2021-128885 filed on Aug. 5, 2021. The entire content of the priority application is incorporated herein by reference.

BACKGROUND ART

A prior art discloses an image forming apparatus configured to reduce a conveying speed of a sheet(s) until a predetermined number of sheets are printed after a paper jam is resolved in order to suppress the paper jam from recurring. The "paper jam" may occur not only when a conveying path is clogged with a sheet, but also when a conveyor does not convey a sheet to an appropriate position.

DESCRIPTION

Types of the paper jam includes a type that is more likely to recur and a type that is less likely to recur. Thus, when the conveying speed of the sheet is reduced irrespective of the type of the paper jam, a time required for forming an image after the paper jam is resolved may unnecessarily increase.

In view of the foregoing, it is an object of the present disclosure to provide an image forming apparatus that can prevent recurrence of a paper jam and prevent a time required for forming an image from unnecessarily increasing after the paper jam is resolved.

In order to attain the above and other object, the present disclosure provides an image forming apparatus comprising: a motor; a temperature detector; a conveyor; a sheet detector; and a controller. The temperature detector is configured to detect an ambient temperature and to output a temperature signal corresponding to the detected ambient temperature. The conveyor is provided at a conveying path along which a sheet is conveyed. The conveyor is configured to convey the sheet in accordance with rotation of the motor. The sheet detector is provided at the conveying path. The sheet detector is configured to output a sheet detection signal indicative of presence or absence of the sheet. The controller is configured to perform: (a) controlling a conveying speed of the sheet using the conveyor by setting a rotation speed of the motor; (b) determining whether or not a paper jam has occurred on the basis of the sheet detection signal outputted from the sheet detector; and (c) determining, when determining in the (b) determining that the paper jam has occurred, whether or not a torque shortage has occurred, the torque shortage being shortage of a torque occurring during conveyance of the sheet using the conveyor. In the (a) controlling, the controller is configured to perform: when determining in the (c) determining that the torque shortage has occurred, and the paper jam is resolved and subsequently conveyance of the sheet is resumed, setting, when the temperature signal indicates that the ambient temperature is higher than a predetermined temperature, the rotation speed of the motor such that the conveying speed of the sheet becomes a first conveying speed; and setting, when the temperature signal indicates that the ambient temperature is lower than or equal to the predetermined temperature, the rotation speed of the motor such that the conveying speed of the sheet becomes a second conveying speed that is slower than the first conveying speed.

In the above configuration, when it is determined that paper jam has occurred, it is determined that torque for conveying the sheet by the conveyor is in shortage. When it is determined that the torque shortage has occurred and when the paper jam is resolved and conveyance of the sheet is resumed: when the temperature signal indicates that the ambient temperature is higher than the predetermined temperature, the rotation speed of the motor is set such that the conveying speed of the sheet becomes the first conveying speed; and when the temperature signal indicates that the ambient temperature is lower than or equal to the predetermined temperature, the rotation speed of the motor is set such that the conveying speed of the sheet becomes the second conveying speed slower than the first conveying speed.

Accordingly, when it is determined that the torque shortage has occurred at a timing when the paper jam occurs, the conveying speed of the sheet is reduced in a case where the paper jam is likely to recur rather than a case where the paper j am is not likely to recur. Consequently, the paper jam can be suppressed from recurring while suppressing unnecessary increase of a time require for forming an image after the paper jam is resolved.

FIRST EMBODIMENT

Figure 1:
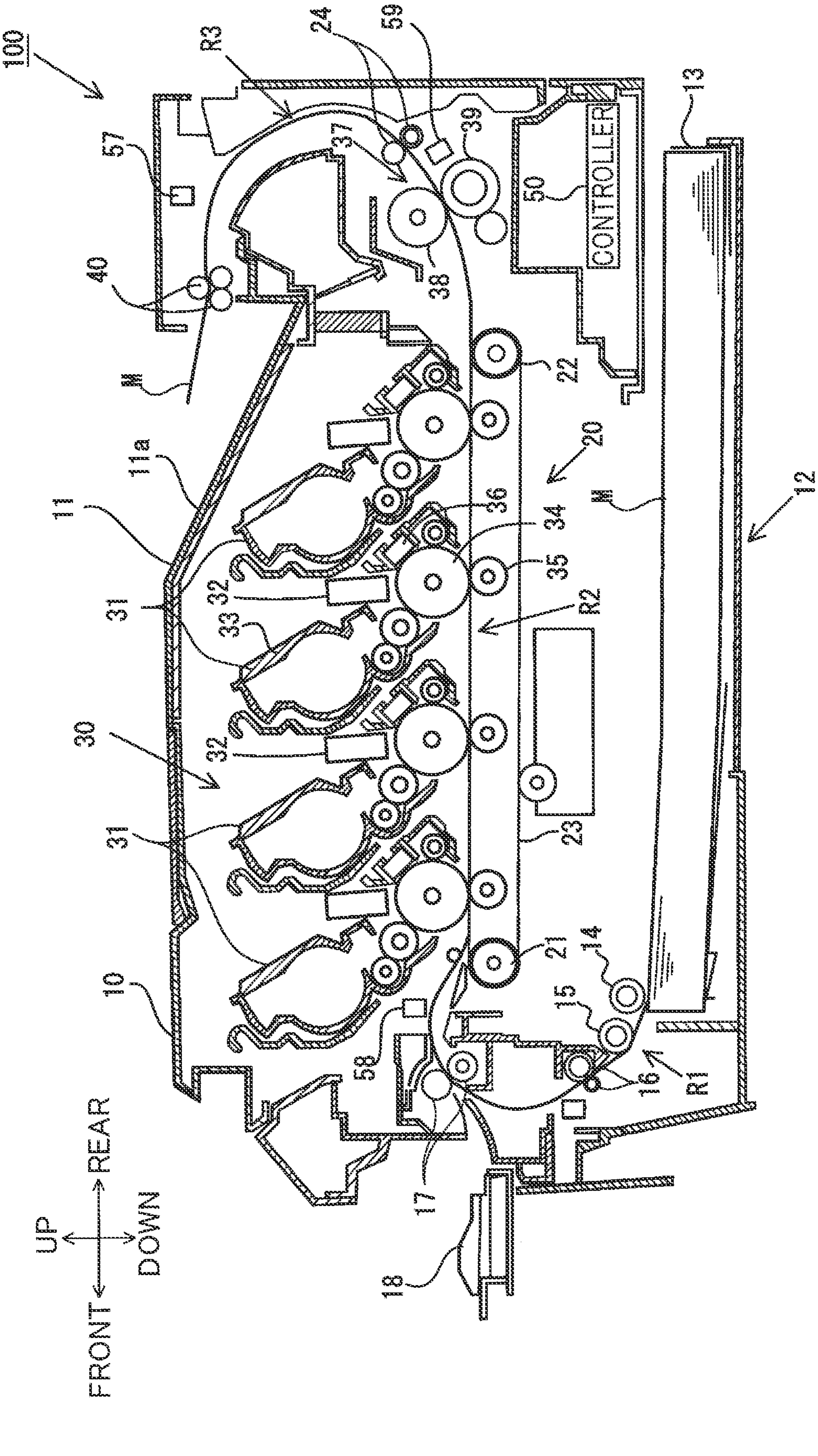
FIG. 1 is a diagram illustrating a configuration of a printer.

Hereinafter, a printer 100 as an example of an image forming apparatus according to a first embodiment of the present disclosure will be described with reference to FIGS. 1 to 5. FIG. 1 is a cross-sectional view illustrating a schematic configuration of the printer 100. In FIG. 1, directions along a vertical direction in a state where the printer 100 is installed will be referred to as "upward" and "downward", respectively. Further, along a horizontal direction orthogonal to the vertical direction, a side at which a user interface 55 (described later) is disposed will be referred to as "frontward", while a side opposite the frontward will be referred to as "rearward".

The printer 100 is a direct transfer tandem-type color printer. The printer 100 mainly includes a housing 10, a feeder unit 12, a conveyor 20, an image forming unit 30, and a controller 50.

The housing 10 has a substantially box-like shape, and has a top cover 11 constituting an upper portion of the housing 10. The top cover 11 is provided so as to be movable between an open position and a closed position about an upper-rear end of the printer 100. By moving the top cover 11 to the open position, a portion of the image forming unit 30 is allowed to be pulled out upward of an interior of the housing 10. The top cover 11 has a discharge tray 11*a* onto which a sheet(s) M as a recording medium is discharged.

The feeder unit 12 is provided at a lower portion of the housing 10. The feeder unit 12 includes a feed tray 13, a feed roller 14, a separation roller 15, a pair of pinch rollers 16, a pair of registration rollers 17, and a manual tray 18. The feed tray 13 is a tray in which a sheet(s) M is accommodated, and is attached to the housing 10 so that the feed tray 13 can be pulled out of the housing 10. A feed path R1 along which the sheet M picked up from the feed tray 13 is conveyed toward the image forming unit 30 is provided frontward of the feed tray 13.

The feed roller 14, the separation roller 15, and the pair of pinch rollers 16 are arranged in this order along the feed path R1. When the feed roller 14 is rotated, the sheet M in the feed tray 13 is picked up toward the separation roller 15. The separation roller 15 is rotated to feed the sheet M picked up by the feed roller 14 toward the pair of pinch rollers 16.

The pair of registration rollers 17 are provided upward of the pair of pinch rollers 16. The pair of registration rollers 17 temporality stops movement of the sheet M by contacting a front edge of the sheet M before feeding the sheet M toward the image forming unit 30, thereby correcting skewing of the sheet M and adjusting timing for image formation on the sheet M. The manual tray 18 is provided frontward of the housing 10. When the manual tray 18 is at its open position, the sheet M can be manually fed toward the pair of registration rollers 17 in the housing 10.

Inside the housing 10, an upstream path R2 along which the sheet M is conveyed is formed downstream of the feed path R1. Specifically, the upstream path R2 extends from the pair of registration rollers 17 toward a fixing unit 37 (described later).

The conveyor 20 includes a drive roller 21, a driven roller 22, a conveying belt 23, and a pair of downstream conveying rollers 24. Of the conveyor 20, the drive roller 21, the driven roller 22, and the conveying belt 23 are disposed along the upstream path R2. The drive roller 21 is a roller that rotates in accordance with rotation of a DC motor 61 (described later). The conveying belt 23 is an endless belt looped over the drive roller 21 and the driven roller 22.

As the drive roller 21 rotates, the conveying belt 23 is driven to be circularly moved clockwise in FIG. 1. As a result, the sheet M placed on an upper surface of the conveying belt 23 is conveyed along the upstream path R2 from the upstream side (i.e., the pair of registration rollers 17 side) toward the downstream side (i.e., the fixing unit 37 side). A belt cleaning unit for removing deposits such as developer (hereinafter referred to as "toner") deposited on the conveying belt 23 is provided downward of the conveying belt 23. The pair of downstream conveying rollers 24 will be described later.

Along the upstream path R2, the image forming unit 30 is disposed at an image forming position where an image is formed on the sheet M. The image forming unit 30 is configured to form an image on the sheet M that has been conveyed to the image forming position by the conveying belt 23. The image forming unit 30 includes a plurality of process units 31, a plurality of LED units 32, and the fixing unit 37. The image forming unit 30 includes four of the process units 31 provided at the image forming position to be arranged from the upstream side to the downstream side. The four process units 31 correspond to four colors of cyan (C), magenta (M), yellow (Y), and black (K), respectively.

Each of the process units 31 includes a developing device 33, a photosensitive drum 34, a transfer roller 35, and a charger 36. The developing device 33 accommodates therein toner of corresponding color (C, M, Y, or K) and configured to supply the toner to an outer circumferential surface of the photosensitive drum 34. In each of the process units 31, the photosensitive drum 34 and the transfer roller 35 contact the conveying belt 23 so as to nip the conveying belt 23 from the upper and lower sides thereof. The charger 36 is disposed diagonally rearward of the photosensitive drum 34 to be spaced apart therefrom with a predetermined interval in order to avoid contact with the photosensitive drum 34.

Each of the LED units 32 is a well-known unit configured to form an electrostatic latent image on the outer circumferential surface of the corresponding photosensitive drum 34 based on image data or a control command inputted from the controller 50. The fixing unit 37 is configured to fix a toner image that has been formed on the sheet M by the process units 31 to the sheet M, and includes a heat roller 38 and a pressure roller 39. The heat roller 38 has a heater therein for raising a temperature of the heat roller 38. The pressure roller 39 is disposed at a position where the pressure roller 39 can nip the sheet M that has been conveyed from the image forming position in cooperation with the heat roller 38 from the upper and lower sides of the sheet M.

In the image forming unit 30 configured as described above, when the sheet M passes through the image forming position on the upstream path R2, the photosensitive drums 34 are exposed to light with LED light emitted from the corresponding LED units 32, and development is performed to form toner images on the photosensitive drums 34 using toners supplied from the developing devices 33. The sheet M is nipped between the photosensitive drum 34 and the transfer roller 35 in each of the process units 31, whereby a toner image of each color formed on the photosensitive drums 34 is transferred onto the sheet M. Thereafter, the sheet M is nipped between the heat roller 38 and the pressure roller 39, and the toner image formed on the sheet M is fixed to the sheet M.

A downstream path R3 is formed downstream of the upstream path R2, i.e., downstream of the fixing unit 37. The sheet M that has passed through the fixing unit 37 is conveyed along the downstream path R3. The pair of downstream conveying rollers 24 constituting the conveyor 20 and the discharge rollers 40 are disposed along the downstream path R3. The sheet M that has passed through the fixing unit 37 is conveyed toward the discharge rollers 40 by the downstream conveying rollers 24. The discharge rollers 40 are configured to discharge the sheet M onto the discharge tray 11*a*. In the present embodiment, the upstream path R2 and the downstream path R3 are examples of the conveying path.

Figure 2:
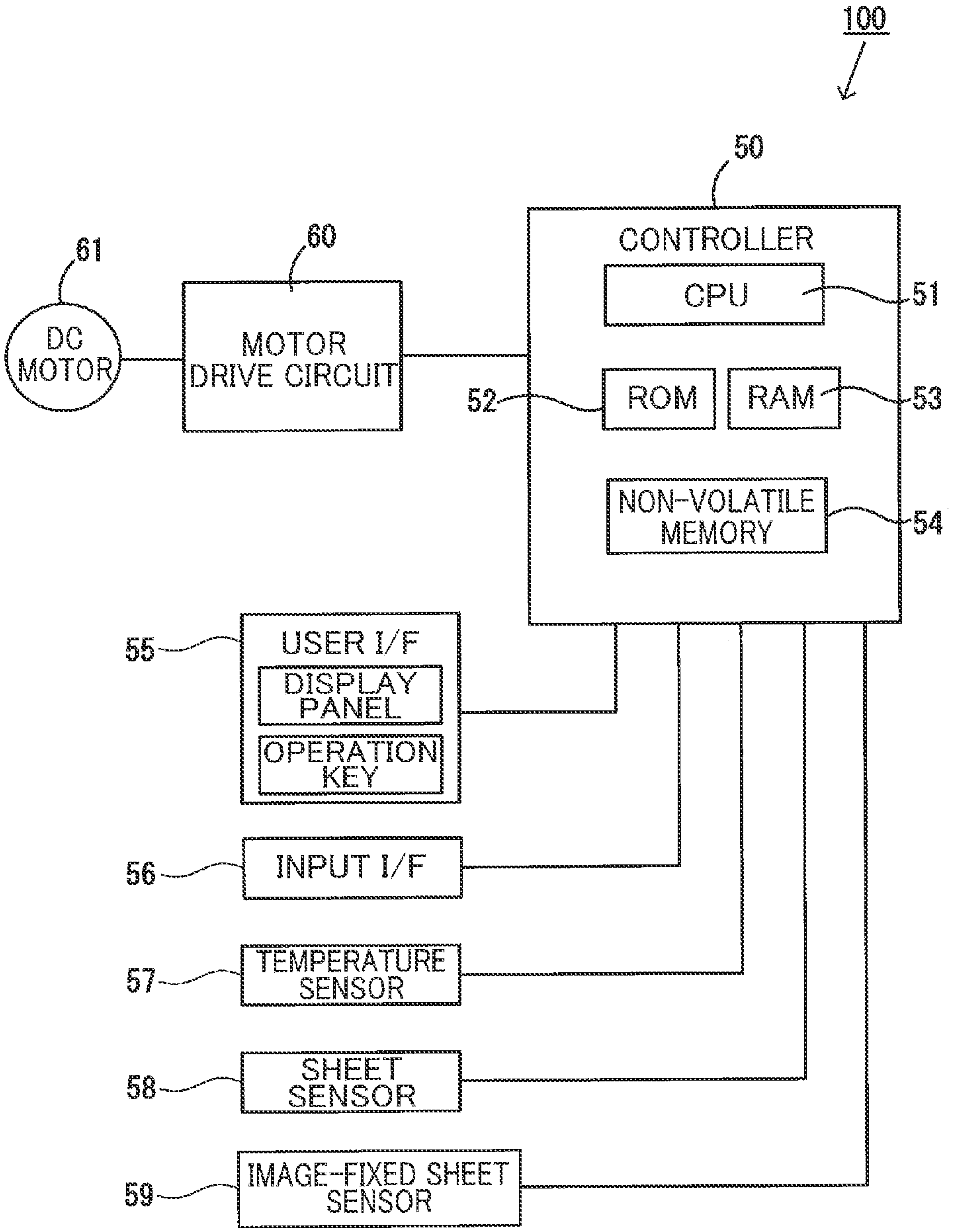
FIG. 2 is a block diagram illustrating the configuration of the printer.

The controller 50 for controlling the printer 100 to be driven is provided at a rear portion of the housing 10. As illustrated in FIG. 2, the controller 50 is a microcomputer including a CPU 51, a ROM 52, a RAM 53, and a non-volatile memory 54.

The controller 50 is connected to the user interface 55, an input interface 56, a temperature sensor 57, a sheet sensor 58, an image-fixed sheet sensor 59, and a motor drive circuit 60. The user interface 55 is an interface between the controller 50 and a user, and includes a display panel, operation keys, and the like. The user interface 55 may be a touch panel that can receive a touch operation of the user. The input interface 56 is an interface configured to communicate with personal computers as external devices. The input interface 56 includes a network interface that allows the printer 100 to be connected to a wired or wireless network, and a USB interface that allows the printer 100 to be connected to the personal computers through a USB cable so that the printer 100 can communicate with the personal computers, for example. Note that the term "interface" is abbreviated as "I/F" in FIG. 2.

The temperature sensor 57 is configured to detect an ambient temperature which is a temperature inside the housing 10. The temperature sensor 57 is provided at an upper portion inside the housing 10 and positioned close to the discharge rollers 40. In the present embodiment, the temperature sensor 57 is an example of the temperature detector.

The sheet sensor 58 detects presence or absence of the sheet M in the upstream path R2. In the housing 10, the sheet sensor 58 is disposed downstream of the pair of registration rollers 17 and upstream of the drive roller 21. That is, in the upstream path R2, the sheet sensor 58 is disposed at the image forming position where the image forming unit 30 forms an image on the sheet M. The image-fixed sheet sensor 59 is disposed downstream of the fixing unit 37, i.e., along the downstream path R3. Each of the sheet sensor 58 and the image-fixed sheet sensor 59 includes, for example, a pivot lever pivotally movable upon contact of the sheet M passing therethrough, and an optical sensor configured to detect pivotal movement of the pivot lever.

In the present embodiment, while a sheet M passes therethrough (that is, when the pivot lever is pivotally moved downward by the sheet M), the sheet sensor 58 and the image-fixed sheet sensor 59 are in their ON states. On the other hand, while a sheet M does not pass therethrough (that is, when the pivot lever is not pivotally moved downward by the sheet M), the sheet sensor 58 and the image-fixed sheet sensor 59 are in their OFF state. However, relationship between a posture of the pivot lever and ON/OFF state of the sheet sensor 58 and the image-fixed sheet sensor 59 may be reversed. The number of sheet sensors provided in the printer 100 is not limited to two (the sheet sensor 58 and the image-fixed sheet sensor 59), but two or more sheet sensors 58 may be disposed on the upstream path R2, for example. In the present embodiment, the sheet sensor 58 and the image-fixed sheet sensor 59 are examples of the sheet detector.

The DC motor 61 is a brushless DC motor and is driven to rotate by direct current. A driving power from the DC motor 61 is transmitted to the feed roller 14, the separation roller 15, the pair of pinch rollers 16, the drive roller 21, the pair of downstream conveying rollers 24, and the discharge roller 40 through a power transmission mechanism (not illustrated). Although only the DC motor 61 is illustrated in FIG. 2, the printer 100 also includes motor(s) for driving the photosensitive drums 34, the transfer rollers 35, and developing rollers provided in the developing devices 33. In the present embodiment, the DC motor 61 is an example of a motor.

The motor drive circuit 60 is configured to drive the DC motor 61 to be rotated under control of the controller 50. The motor drive circuit 60 includes, for example, switching elements, and can control electric power to be supplied to the DC motor 61. When driving the DC motor 61 to be rotated, the controller 50 outputs a motor ON signal and a clock signal to the motor drive circuit 60. The motor ON signal is a signal for commanding drive or non-drive of the DC motor 61. The DC motor 61 is controlled to be driven when the motor ON signal is "ON", whereas the DC motor 61 is controlled not to be driven when the motor ON signal is "OFF".

The clock signal is a signal for designating a rotation speed of the DC motor 61. When the motor ON signal inputted from the controller 50 is "ON", the motor drive circuit 60 controls power supply to a stator coil (not illustrated) of the DC motor 61 in accordance with duty cycle of the inputted clock signal, thereby increasing the rotation speed of the DC motor 61. Thereafter, when the rotation speed of the DC motor 61 reaches a predetermined speed, the motor drive circuit 60 outputs a motor lock signal to the controller 50. When the motor lock signal is "ON", the motor lock signal causes the controller 50 to output a motor ON signal for maintaining the rotation speed of the DC motor 61 at a constant speed.

The controller 50 can switch a conveying speed of the sheet M in a printing operation between a full-speed V1 and a half-speed V2 slower than the full-speed V1. Specifically, the controller 50 can switch settings in the printing operation between a full-speed print setting in which the controller 50 controls the rotation speed of the DC motor 61 such that the sheet M is conveyed at the full-speed V1, and a half-speed print setting in which the controller 50 controls the rotation speed of the DC motor 61 such that the sheet M is conveyed at the half-speed V2.

More specifically, when a common paper such as high-quality paper is designated as the sheet M in a print setting included in a print job, the controller 50 switches the settings to the full-speed print setting. On the other hand, when thick paper, postcard, envelope, or the like is designated as the sheet M, the controller 50 switches the settings to the half-speed print setting. Thick paper has a large heat capacity and thus requires a larger amount of heat, and a torque required for conveying thick paper as the sheet M is greater than that for high-quality paper. Accordingly, reducing a printing speed for the sheet M can satisfy both the above requirements (i.e., large amount of heat and large amount of torque).

In the half-speed print setting, the duty cycle of the clock signal outputted from the controller 50 is set to a half value of that in the full-speed printing, whereby the conveying speed of the sheet M is controlled to the half-speed V2. In addition, when a print mode requiring print quality such as "photo printing" is designated in the print setting, the controller 50 also performs a printing operation under the half-speed print setting. The non-volatile memory 54 stores therein the duty cycles of the clock signal in the full-speed print setting and the half-speed print setting selected depending on various print settings, and the controller 50 refers to the non-volatile memory 54 to select a value of the appropriate duty cycle. In the present embodiment, the full-speed print setting is an example of the first setting, and the half-speed print setting is an example of the second setting. Further, the full-speed V1 is an example of the first conveying speed, and the half-speed V2 is an example of the second conveying speed.

In the printer 100 with the above configuration, a paper jam may occur when the upstream path R2 in the housing 10 is clogged with the sheet M. The paper jam includes a type that is more likely to recur after the paper jam is resolved, and a type that is less likely to recur. In particular, the paper jam is more likely to recur when a torque shortage, in which drive torque of the DC motor 61 becomes smaller than a conveying load for conveying the sheet M, has occurred.

The torque shortage may also be caused by a change in the ambient temperature. When the ambient temperature becomes equal to or lower than a predetermined value, for example, a conveying load may increase due to an increase in viscosity of lubricant, or drive torque of the DC motor 61 may decrease, which leads to the torque shortage. Therefore, the paper jam caused by the torque shortage may recur depending on the ambient temperature even after the paper jam is once resolved.

On the other hand, when the ambient temperature is sufficient high after the paper jam is resolved, a possibility of recurrence of the paper jam decreases. Thus, in the present embodiment, when resuming conveyance of the sheet M after the paper jam is resolved, the controller 50 sets the conveying speed of the sheet M to one of the full-speed V1 and the half-speed V2 in accordance with the ambient temperature.

Figure 3:
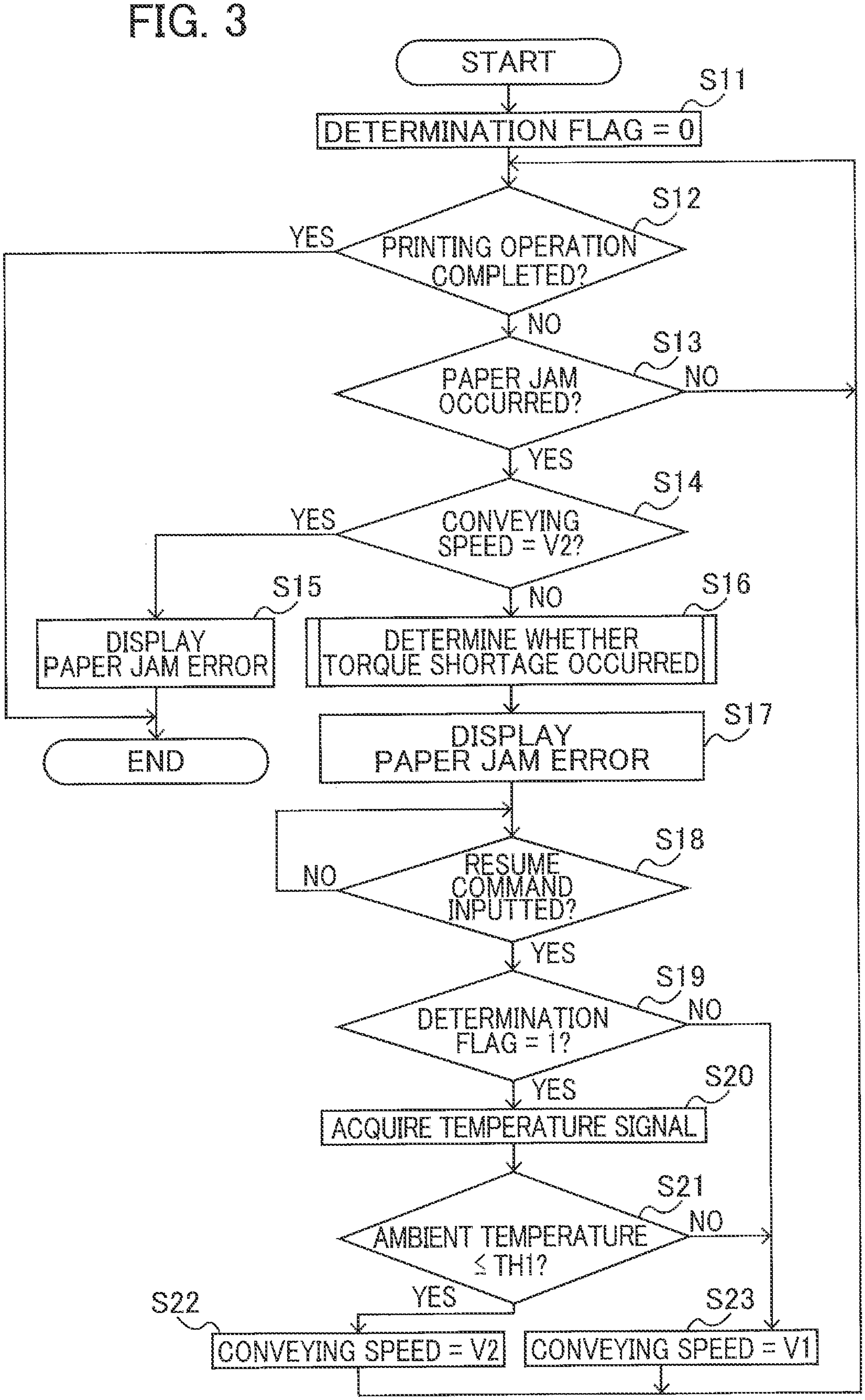
FIG. 3 is a flowchart illustrating steps in a process executed when a printing operation is performed.

FIG. 3 is a flowchart illustrating process that the controller 50 executes when the sheet M is conveyed. The process illustrated in FIG. 3 is executed by the controller 50 in response to receipt of a print job and a print execution command for the print job from a personal computer as an external device through the input interface 56. The controller 50 also executes a printing operation as process different from that in FIG. 3. In the printing operation, the controller 50 sets a frequency of the clock signal in accordance with contents of the print setting included in the print job input thereto through the input interface 56, and turns "ON" the motor ON signal, whereby the rotation speed of the DC motor 61 is increased.

In S11 (hereinafter "step" is abbreviated merely as "S"), a value of a determination flag is set to an initial value "0". The determination flag is information indicative of whether the torque shortage has occurred in the conveyor 20 at a timing of occurrence of the paper jam. The value "0" of the determination flag indicates that the torque is not in shortage in the conveyor 20, whereas the values "1" indicates that the torque is in shortage in the conveyor 20.

In S12, it is determined that whether the current printing operation has been completed. When the printing operation has been completed and determination made in S12 is YES, the controller 50 ends the process in FIG. 3. On the other hand, when the printing operation has not yet been completed and determination made in S12 is NO, it is determined in S13 whether a paper jam has occurred.

Specifically, the presence or absence of the sheet M passing through the upstream path R2 and the downstream path R3 is determined referring to signals outputted from the sheet sensor 58 and the image-fixed sheet sensor 59. When the presence or absence of the sheet M is not changed for a predetermined period of time during conveyance of the sheet M, that is, when conveyance of the sheet M does not advance for a predetermined period of time, a paper jam is determined to have occurred. When determination made in S13 is NO, the routine returns to S12. In the present embodiment, the process of S13 executed by the controller 50 is an example of the (b) determining.

When determination made in S13 is YES, the routine advances to S14. In S14, it is determined whether the current conveying speed of the sheet M is the half-speed V2. Specifically, it is determined in S14 which of the full-speed print setting in which the sheet M is conveyed at the full-speed V1 or the half-speed print setting in which the sheet M is conveyed at the half-speed V2 is selected.

When the conveying speed of the sheet M is the half-speed V2 and determination made in S14 is YES, the routine advances to S15. In S15, the controller 50 controls the user interface 55 to display a paper jam error thereon, and ends the process of FIG. 3. Specifically, in S15, the user interface 55 displays thereon a text message and the like indicating that the paper jam has occurred. While the paper jam error is displayed in S15, process including the conveyance of the sheet M is stopped. In this case, since the paper jam occurs even though the conveying speed of the sheet M is the half-speed V2, drive needs to be stopped immediately.

On the other hand, when the conveying speed of the sheet M is the full-speed V1 and determination made in S14 is NO, the routine advances to S16. In S16, it is determined whether a torque shortage has occurred during conveyance of the sheet M. In the present embodiment, the process of S16 executed by the controller 50 is an example of the (c) determining.

Figure 4:
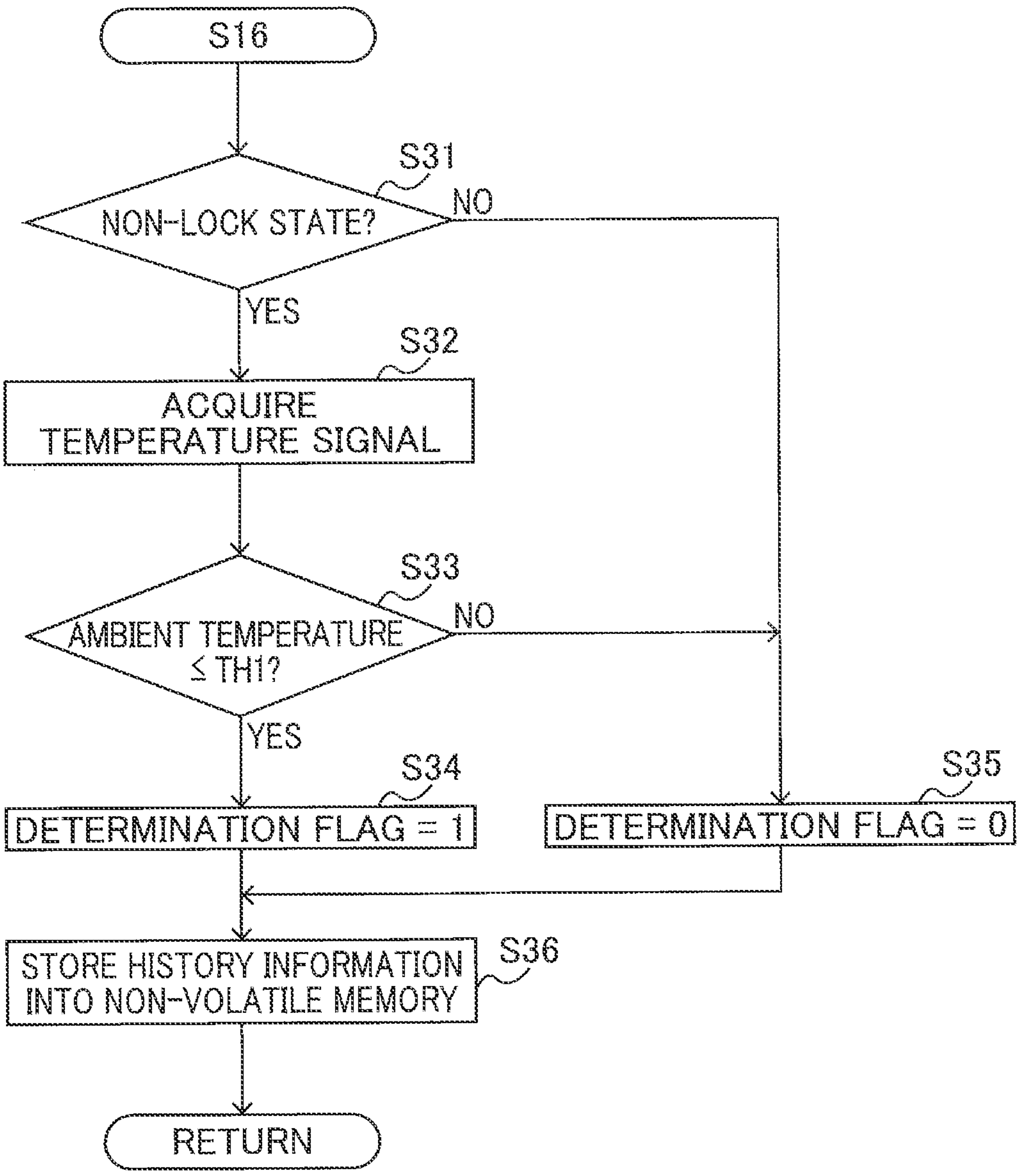
FIG. 4 is a flowchart illustrating steps in a process executed in S16.

FIG. 4 is a flowchart for explaining details of process executed in S16. First, in S31 it is determined whether the DC motor 61 is in its non-lock state. In the non-lock state, a motor lock signal is not outputted from the motor drive circuit 60 to the controller 50, and therefore the DC motor 61 is not subjected to constant speed control. Unless the torque is in shortage, a torque fluctuation of the DC motor 61 is stable, and the motor lock signal is outputted from the motor drive circuit 60 when the rotation speed of the DC motor 61 stably reaches a desired value.

On the other hand, when the torque is in shortage when the sheet M is conveyed, the torque fluctuation of the DC motor 61 becomes large and the DC motor 61 is not driven stably at a desired rotation speed, so that the motor lock signal is not outputted from the motor drive circuit 60.

When the DC motor 61 is in its lock state to be subjected to constant speed control and determination made in S31 is NO, the routine advances to S35. In S35, the value of the determination flag is set to "0" to indicate that the toque shortage has not occurred. After completion of the process of S35, the routine advances to S36.

On the other hand, when determination made in S31 is YES, the routine advances to S32. In S32, a temperature signal detected in accordance with the ambient temperature is acquired. Specifically, the temperature sensor 57 detects the current ambient temperature, and outputs a temperature signal corresponding to the current ambient temperature. The controller acquires the outputted temperature signal.

In S33, it is determined whether the temperature signal acquired in S32 indicates that the ambient temperature is equal to or lower than a first temperature TH1. The first temperature TH1 is an upper limit value of the temperature having a high possibility of causing a torque shortage at the time of conveyance of the sheet M, and is, for example, 8° C. That is, when the paper jam occurs in a state where the ambient temperature is a value lower than the first temperature TH1, the torque shortage is highly likely to have occurred due to an increase in the conveying load associated with an increase in viscosity of lubricant or a reduction of the drive torque of the DC motor 61. In the present embodiment, the first temperature TH1 is an example of the predetermined temperature.

When determination made in S33 is YES (S33: YES), the routine advances to S34, where the value of the determination flag is set to "1" to indicate that the toque is in shortage. After completion of the process of S34, the routine advances to S36.

On the other hand, when the temperature signal indicates that the ambient temperature is a value higher than the first temperature TH1 and determination made in S33 is NO, and the routine advances to S35. In S35, the value of the determination flag is set to "0" to indicate that the torque is not in shortage. That is, when the ambient temperature is higher than the first temperature TH1, the paper jam is highly likely to have occurred due to factors other than the torque shortage.

In S36, the value of the determination flag set in S34 or S35 is stored in the non-volatile memory 54 as history information. At this time, values of a frequency of the clock signal for the DC motor 61 to rotate at a desired speed after the paper jam is resolved is also stored in the non-volatile memory 54 together with the value of the determination flag. In other words, in S36, the controller 50 stores the rotation speed of the DC motor 61 corresponding to the full-speed V1, the rotation speed of the motor 61 corresponding to the half-speed V2, and the value of the determination flag into the non-volatile memory 54. After completing the process of S36, the routine advances to S17 of FIG. 3. In the present embodiment, the process of S36 executed by the controller 50 is an example of the (e) storing.

In S17 of FIG. 3, the controller 50 controls the user interface 55 to display the paper jam error thereon. The paper jam error displayed on the user interface 55 is the same as the image displayed on the user interface 55 in S15. Note that a text message and the like indicating that the torque shortage has occurred may be displayed on the user interface 55 in S17. During display of the paper jam error in S17, process including conveyance of the sheet M is stopped. In the present embodiment, the process of S17 executed by the controller is an example of the (d) notifying.

Once a user resolves the paper jam, the paper jam error in S17 is no longer displayed on the user interface 55. The paper jam is resolved by, for example, the user moving the top cover 11 to the open position and removing the sheet M remaining in the upstream path R2 or the downstream path R3. At this time, the controller 50 may regard change in the position of the top cover 11 from the open position to the closed position as one condition that the paper jam has been resolved. When the paper jam has been resolved, the controller 50 controls the user interface 55 so that the display panel of the user interface 55 displays thereon a message prompting the user to input a resume command for resuming conveyance of the sheet M, and waits for the user input.

In S18, it is determined whether the resume command to resume conveyance of the sheet M is inputted since the paper jam has been resolved. When determination made in S18 is NO, the paper jam has not yet been addressed by the user, and the controller 50 waits until the paper jam is resolved. When determination made in S18 is YES, the routine advances to S19.

In S19 it is determined whether the value of the determination flag is set to “1” indicating that the torque is in shortage. When determination made in S19 is NO, the routine advances to S23 in which the conveying speed of the sheet M after the conveyance the sheet M is resumed is set to the full-speed V1. This is because the paper jam is less likely to recur after the paper jam is resolved, unless the torque shortage has occurred at a timing of occurrence of the paper jam.

When determination made in S19 is YES, the routine advances to S20. In S20 a temperature signal corresponding to the ambient temperature is acquired. Specifically, the controller 50 acquires a temperature signal currently detected by the temperature sensor 57. In other words, in S20, the ambient temperature at a timing of resumption of the conveyance of the sheet M after the paper jam is resolved is detected.

Figure 5:
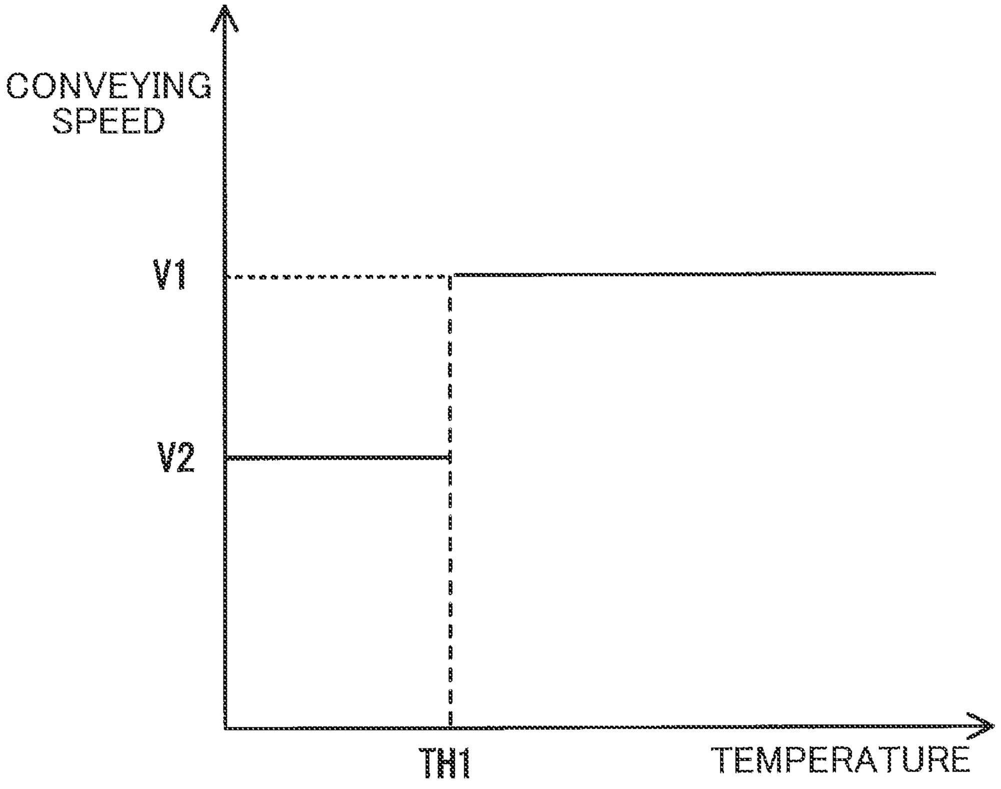
FIG. 5 is a graph showing relationship between a conveying speed and a temperature when conveyance of a sheet is resumed.

In S21, it is determined whether the temperature signal acquired in S20 is a value indicating that the ambient temperature is equal to or lower than the first temperature TH1. The first temperature TH1 is the same value as used in S33 and is, for example, 8° C. FIG. 5 is a graph for explaining relationship between the conveying speed and the temperature at a timing when the conveyance of the sheet M is resumed. The controller 50 changes the conveying speed between two stages depending on the value of the temperature signal after the paper jam has been resolved.

Specifically, when the temperature signal is a value indicating that the ambient temperature is higher than the first temperature TH1, determination made in S21 is NO. Then, the routine advances to S23 in which the rotation speed of the DC motor 61 is controlled so that the conveying speed becomes the full-speed V1. That is, when the ambient temperature is higher than the first temperature TH1, the paper jam is less likely to recur after resumption of conveyance of the sheet M, so that the conveying speed is set to the full-speed V1 in order to suppress an increase in a time required for the printing operation after the conveyance of the sheet M has been resumed.

On the other hand, when the temperature signal is a value indicating that the ambient temperature is equal to or lower than the first temperature TH1, determination made in S21 is YES, and the routine advances to S22. In S22, the rotation speed of the DC motor 61 is controlled so that the conveying speed becomes the half-speed V2 slower than the full-speed V1. That is, when the ambient temperature indicated by the temperature signal is equal to or lower than the first temperature TH1, the paper jam caused by the torque shortage is highly likely to recur after conveyance of the sheet M has been resolved. Accordingly, the conveying speed is decreased in order to prevent recurrence of the paper jam.

After completion of the process of S22 or S23, the routine returns to S12. Then, the process of S13 to S23 is repeated until the current printing operation is determined to be completed in S12. When the current printing operation is determined to be completed in S12, the routine of FIG. 3 is ended. In the present embodiment, the process of S18 to S23 executed by the controller is an example of the (a) controlling.

According to the embodiment described above, the following advantages can be obtained.

When determination is made after occurrence of the paper jam that the torque shortage has occurred, and when the temperature signal indicates that the ambient temperature is higher than the first temperature TH1 at a timing when the conveyance of the sheet M is resumed after the paper jam is resolved, the controller 50 sets the rotation speed of the DC motor 61 such that the conveying speed of the sheet M becomes the full-speed V1. On the other hand, when the temperature signal indicates that the ambient temperature is equal to or lower the first temperature TH1, the controller 50 sets the rotation speed of the DC motor 61 such that the conveying speed of the sheet M becomes the half-speed V2.

Through this operation, the conveying speed of the sheet M is decreased in a case where the paper jam is highly likely to recur after the paper jam is resolved than a case where the paper jam is less likely to recur. As a result, recurrence of the paper jam can be prevented, and a time required for the printer 100 to form an image after the paper jam is resolved can be prevented from unnecessarily increasing caused by decrease in the conveying speed of the sheet M.

Since the drive torque of the DC motor 61 becomes lower as the conveying speed becomes higher, the controller 50 determines whether the torque is in shortage on condition that the full-speed print setting in which the sheet M is conveyed at the full-speed V1 is being selected. This operation can prevent an unnecessary increase in a time required for forming an image after the paper jam is resolved which is caused by a reduction in the conveying speed.

A condition for the controller 50 determining that the torque is in shortage includes determination that the temperature signal indicates that the ambient temperature is a value equal to or lower than the first temperature TH1. Thus, when the ambient temperature raises after the paper jam is resolved, an unnecessary increase in a time required for forming an image due to a reduction in the conveying speed can be restrained.

The controller 50 determines whether the torque for conveying the sheet M is in shortage based on the torque fluctuation of the DC motor 61 during a predetermined period of time. This operation allows efficient determination on whether the torque is in shortage by using an existing phenomenon, i.e., the torque fluctuation of the DC motor 61.

When determining that the torque shortage has not occurred, the controller 50 sets the rotation speed of the DC motor 61 such that the conveying speed of the sheet M becomes the full-speed V1 at a timing when the conveyance of the sheet M is resumed after the paper jam is resolved. Accordingly, an unnecessary increase in a time required for printing after the paper jam has been resolved can be restrained.

After determining that the torque shortage has occurred and until the print jam is resolved, the controller 50 controls the user interface 55 to inform of an error message. With this operation, the user can recognize that the paper jam has occurred, thereby reducing a time required for the user to resolve the paper jam.

Modification to First Embodiment

In the process in S16 of FIG. 3 on determining whether the torque is in shortage, the temperature signal may not be employed as a determination condition. In this case, when it is determined that the DC motor 61 is in the non-lock state in S31 of FIG. 4, the routine may advance to S34, and the value of the determination flag may be set to "1". That is, the process of S32 and S33 is omitted.

In the first embodiment, the conveying speed of the sheet M is set to the half-speed V2 after the process of S22 is executed and until the printing operation is determined to be completed in FIG. 12. Instead, when the number of sheets to be printed specified by a print job is two or more, after completion of the process of S22, the conveying speed of the sheet M may be changed from the half-speed V2 to the full-speed V1 on condition that the number of sheets M that have been printed exceeds a predetermined number.

Second Embodiment

Next, a second embodiment of the present disclosure will be described with reference to FIGS. 6 and 7. In the second embodiment, configurations different from those in the first embodiment will be mainly described. Further, in the second embodiment, parts and components similar to the first embodiment are designated with the reference numerals the same as those in the first embodiment in order to avoid duplicating description.

In the first embodiment described above, when the ambient temperature is low after the paper jam is resolved, the conveying speed of the sheet M is reduced in one stage to the half-speed V2. In place of this, in the present embodiment, the conveying speed of the sheet M is changed in two stages in accordance with the ambient temperature after of the paper jam is resolved.

Figure 6:
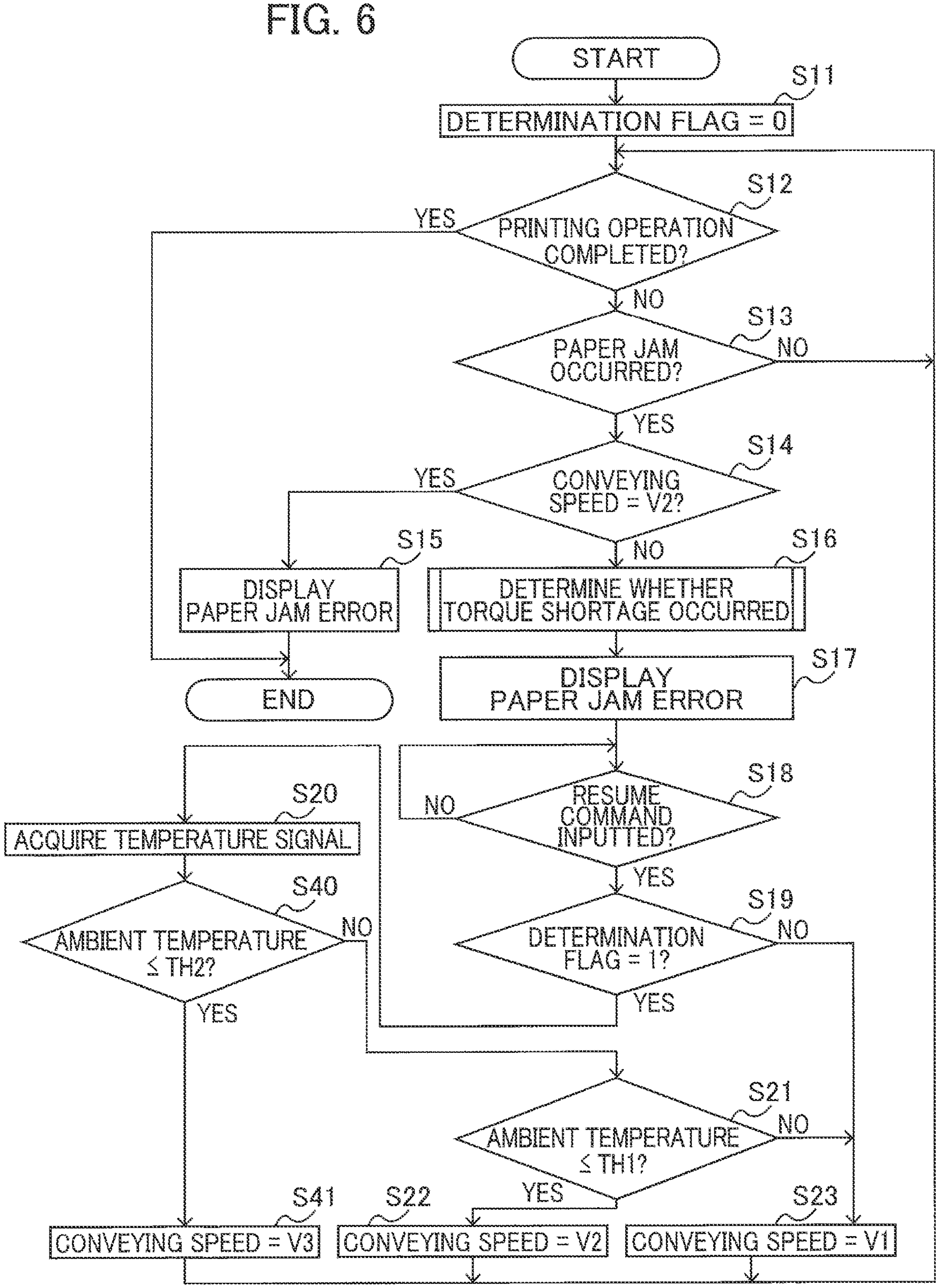
FIG. 6 is a flowchart illustrating steps in a process executed when a printing operation is performed.

FIG. 6 is a flowchart illustrating a process that the controller 50 executes at a timing when the sheet M is conveyed. The main entity of the operation in this flowchart is the controller 50.

As in the first embodiment, when it is determined in S13 that the paper jam has occurred and determination made in S14 is NO, the routine advances to S16, and the torque shortage has occurred or not is determined in S16 in the second embodiment. Thereafter, when the value of the determination flag is set to "1" indicating that the torque is in shortage in S19, the routine advances to S20 in which the temperature signal is acquired.

In S40, it is determined whether the temperature signal is a value indicating that the ambient temperature is equal to or lower than a second temperature TH2. As illustrated in FIG. 7, the second temperature TH2 is lower than the first temperature (for example, 8° C.) and higher than the lower limit value of the temperature at which the operation of the printer 100 is assured. When determination made in S40 is YES, the routine advances to S41. In S41, the rotation speed of the DC motor 61 is set such that the conveying speed of the sheet M becomes a low-speed V3. As illustrated in FIG. 7, the low-speed V3 is slower than the half-speed V2 and faster than the lower limit value of a speed at which the sheet M can be conveyed.

On the other hand, when determination made in S40 is NO, the routine advances to S21, and it is determined in S21 whether the temperature signal is a value indicating that the ambient temperature is equal to or lower than the first temperature TH1. When determination made in S21 is YES, the routine advances to S22 in which the rotation speed of the DC motor 61 is set such that the conveying speed of the sheet M becomes the half-speed V2. On the other hand, when determination made in S21 is NO, the routine advances to S23. In S23, the rotation speed of the DC motor 61 is set such that the conveying speed of the sheet M becomes the full-speed V1.

Figure 7:
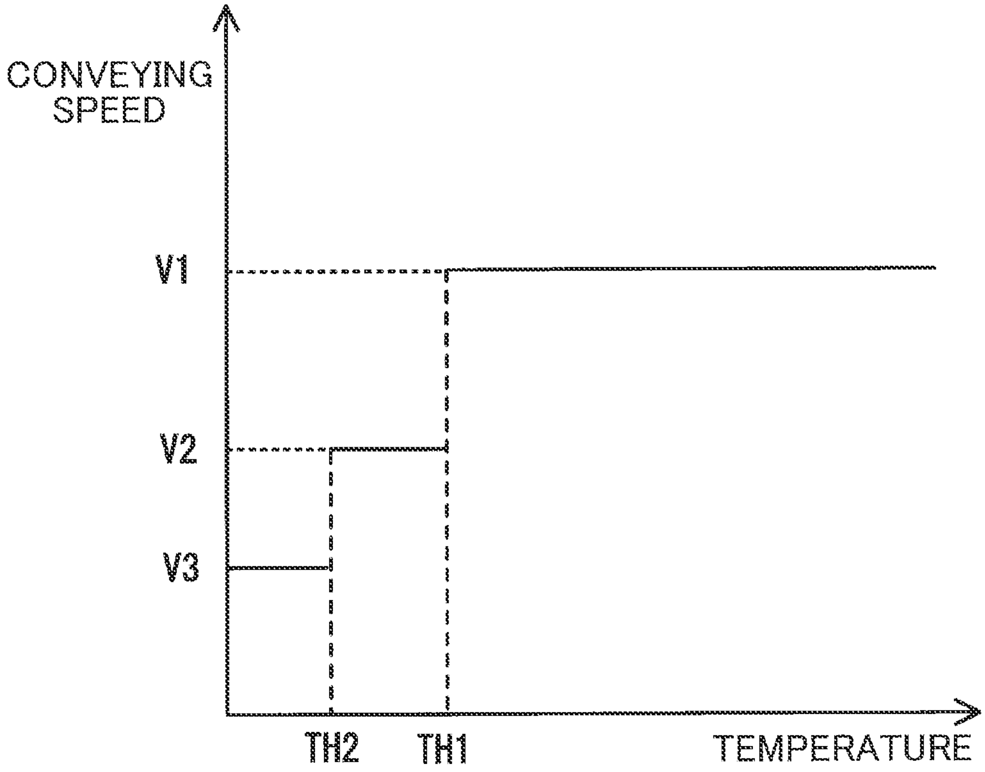
FIG. 7 is a graph showing relationship between a conveying speed and a temperature when conveyance of a sheet is resumed.

That is, in the present embodiment, the conveying speed after the paper jam is resolved is changed between three stages depending on the ambient temperature, as illustrated in FIG. 7. At this time, when the ambient temperature is equal to or lower than the first temperature TH1, the conveying speed of the sheet M is changed between two stages in accordance with the detected ambient temperature.

The present embodiment described above can exhibit advantages the same as those in the first embodiment. Further, when the ambient temperature is equal to or lower than the second temperature TH2 that is lower than the first temperature TH1, the conveying speed is set to the low-speed V3, whereby recurrence of the paper jam caused by the torque shortage can be further prevented.

Other Embodiments

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above embodiments, when it is determined after the paper jam is resolved that the toque shortage has not occurred, the conveying speed is set to the full-speed V1. However, when it is determined that the toque has not been in shortage, the conveying speed may be set to the half-speed V2 after the paper jam is resolved. In this case, when the value of the determination flag is set to "0" and determination made in S19 is NO, the routine advances to S22, and the rotation speed of the DC motor 61 is controlled so that the conveying speed is set to the half-speed V2.

In the above embodiments, the conveying speed of the sheet M is changed between two or three stages after the paper jam is resolved. In place of this configuration, the conveying speed of the sheet M may be changed after the paper jam is resolved between four or more stages depending on the value indicated by the temperature signal. In this case, when the temperature signal acquired after the paper jam is resolved indicates that the ambient temperature is equal to or lower than the first temperature TH1, the rotation speed of the DC motor 61 is controlled such that the conveying speed of the sheet M becomes slower as the value indicated by the temperature signal is lower.

In the above embodiments, a brushless DC motor is used as the motor. However, the motor may be a brush DC motor, or a stepping DC motor provided with an encoder. Alternatively, an AC motor may be employed.

Although the temperature sensor 57 detects the temperature inside the housing 10 as the ambient temperature in the above embodiments, the temperature sensor 57 may detect the temperature around the printer 100 outside the housing 10 as the ambient temperature.

In the above embodiments, a printer is employed as an example of the image forming apparatus. In place of this, the image forming apparatus may be a multifunction peripheral having both functions of reading an image and of performing a printing operation.

What is claimed is:

1. An image forming apparatus comprising:
a motor;
a temperature detector configured to detect an ambient temperature and to output a temperature signal corresponding to the ambient temperature;
a conveyor provided at a conveying path along which a sheet is conveyed, the conveyor being configured to convey the sheet in accordance with rotation of the motor;
a sheet detector provided at the conveying path, the sheet detector being configured to output a sheet detection signal indicative of presence or absence of the sheet; and
a controller configured to perform:
(a) controlling a conveying speed of the sheet using the conveyor by setting a rotation speed of the motor;
(b) determining whether or not a paper jam has occurred on the basis of the sheet detection signal outputted from the sheet detector; and
(c) determining, when determining in the (b) determining that the paper jam has occurred, whether or not a torque shortage has occurred, the torque shortage being shortage of a torque occurring during conveyance of the sheet using the conveyor,
wherein, in the (a) controlling, the controller is configured to perform:
when determining in the (c) determining that the torque shortage has occurred, and the paper jam is resolved and subsequently conveyance of the sheet is resumed,
setting, when the temperature signal indicates that the ambient temperature is higher than a predetermined temperature, the rotation speed of the motor such that the conveying speed of the sheet becomes a first conveying speed; and
setting, when the temperature signal indicates that the ambient temperature is lower than or equal to the predetermined temperature, the rotation speed of the motor such that the conveying speed of the sheet becomes a second conveying speed that is slower than the first conveying speed.

2. The image forming apparatus according to claim 1,
wherein, in the (a) controlling, the controller switches a setting between:
a first setting in which the rotation speed of the motor is set such that the conveying speed of the sheet becomes the first conveying speed; and
a second setting in which the rotation speed of the motor is set such that the sheet is conveyed at the second conveying speed, and
wherein the controller performs the (c) determining when determining that the sheet is conveyed in the first setting.

3. The image forming apparatus according to claim 1,
wherein, in response to a prescribed condition being met, the controller determines in the (c) determining that the torque shortage has occurred, and
wherein the prescribed condition includes at least a condition that the temperature signal indicates that the ambient temperature is lower than or equal to the predetermined temperature.

4. The image forming apparatus according to claim 1,
wherein, in the (c) determining, the controller determines whether or not the torque shortage has occurred on the basis of a torque fluctuation of the motor in a predetermined period of time during conveyance of the sheet.

5. The image forming apparatus according to claim 1,
wherein, in the (a) controlling, the controller is configured to further perform:
when determining in the (c) determining that the torque shortage has not occurred, and conveyance of the sheet is resumed,
setting the rotation speed of the motor such that the conveying speed of the sheet becomes the first conveying speed.

6. The image forming apparatus according to claim 1, further comprising a user interface,
wherein the controller is configured to further perform:
(d) notifying, after determining in the (c) determining that the torque shortage has occurred, an error message using the user interface until the paper jam is resolved.

7. The image forming apparatus according to claim 1, further comprising a non-volatile memory,
wherein the controller is configured to further perform:
(e) storing, into the non-volatile memory, the rotation speed of the motor corresponding to the first conveying speed, the rotation speed of the motor corresponding to the second conveying speed, and a result of determination made in the (c) determining.

8. The image forming apparatus according to claim 2, further comprising an input part through which selection command for selecting one of the first setting and the second setting is inputted, wherein, in the (a) controlling, the controller switches the setting between the first setting and the second setting in accordance with the selection command inputted through the input part.

9. The image forming apparatus according to claim 1, wherein the second conveying speed is half the speed of the first conveying speed.

* * * * *